United States Patent [19]

Hanamori et al.

[11] Patent Number: 4,720,650
[45] Date of Patent: Jan. 19, 1988

[54] MOTOR

[75] Inventors: Ryoichi Hanamori; Hiroshi Yamamoto, both of Yokohama, Japan

[73] Assignees: Canon Kabushiki Kaisha; Canon Seiki Kabushiki Kaisha, both of Tokyo, Japan

[21] Appl. No.: 943,504

[22] Filed: Dec. 19, 1986

[30] Foreign Application Priority Data

Dec. 28, 1985 [JP] Japan .............. 60-199901[U]

[51] Int. Cl.$^4$ ............................................. H02K 1/22
[52] U.S. Cl. ...................................... 310/266; 310/90; 310/43; 384/909
[58] Field of Search .......... 310/90, 266, 43, 45; 384/247, 322, 449, 469, 907, 909, 527

[56] References Cited

U.S. PATENT DOCUMENTS

| | | | |
|---|---|---|---|
| 2,076,239 | 4/1937 | Lemmon | 384/449 |
| 2,805,107 | 9/1957 | Van De Warker | 384/449 X |
| 3,135,564 | 6/1964 | Agens | 384/909 X |
| 3,533,666 | 10/1970 | Gaudry | 384/527 X |
| 3,635,535 | 1/1972 | Schultenkamper | 384/909 X |
| 3,996,143 | 12/1976 | Orkin et al. | 384/909 X |
| 4,152,060 | 5/1979 | Specht | 354/400 |
| 4,519,691 | 5/1985 | Yamada et al. | 354/400 |
| 4,560,894 | 12/1985 | Stoll | 310/266 X |

FOREIGN PATENT DOCUMENTS 57-166487 10/1982 Japan .

Primary Examiner—Mark O. Budd
Attorney, Agent, or Firm—Fitzpatrick, Cella, Harper & Scinto

[57] ABSTRACT

A motor in which a coil constituting a rotor is integrally formed with self-lubricating resin or oil-containing resin to construct a portion of a bearing, which is utilized as a part of a roller or sliding bearing.

1 Claim, 6 Drawing Figures

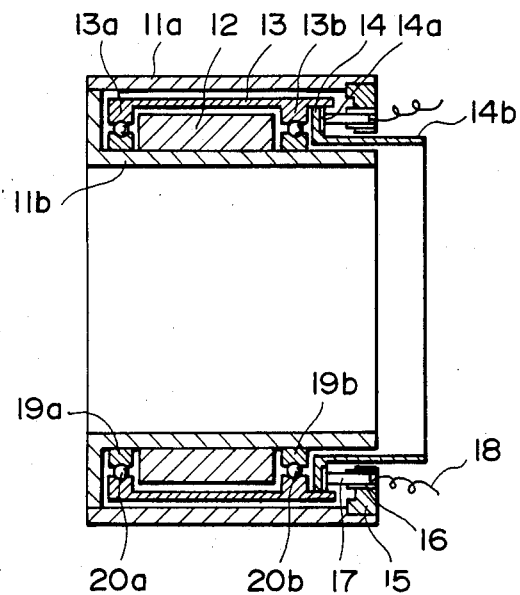
FIG. 1
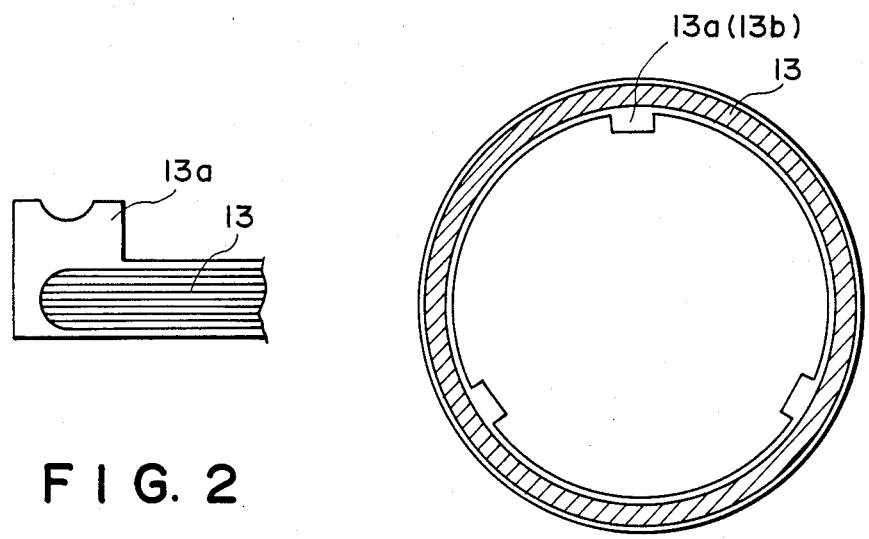
FIG. 2
FIG. 3

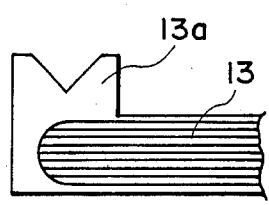
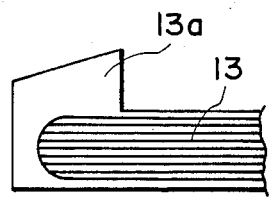
F I G. 4　　F I G. 5
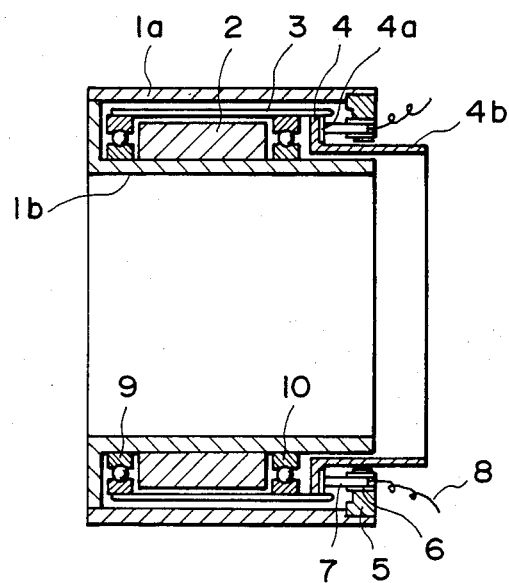
F I G. 6

MOTOR

BACKGROUND OF THE INVENTION

1. Field of the Invention

The present invention relates to a bearing structure of a so-called hollow coreless motor.

2. Related Background Art

FIG. 6 shows an example of conventional hollow motor wherein an outer yoke 1a of a soft magnetic material serving as a stator and an inner yoke 1b constitutes the main body of a coreless motor with hollow double cylinders. On the external periphery of said inner yoke 1b there is fixed an annular magnet 2, and a coil 3 serving as a rotor opposed to the air gap portion said magnet 2 is provided rotatably with ball bearings 9, 10 with a suitable gap to said outer yoke 1a. A coil support member 4, supporting said coil 3, is provided with a commutator 4a and an output portion 4b for transmitting the rotation of the motor to the outside. On the other hand, a brush support member 5, composed of an insulating material such as plastics and fixed at an end of said outer yoke 1a, is provided with a brush support portion 6 for supporting brushes 7, which are in sliding contact with said commutator 4a and which receive power supply through lead wires 8 to rotate the rotor with said output portion 4b through already known commutating function.

Conventional hollow cylindrical motor, having an aperture along the center of rotation for example for passing a light beam or placing lenses therein is so constructed as to rotate through a screw coupling or a helicoid coupled as disclosed in the U.S. Pat. No. 4,152,060, and is associated with a loss in the transmission efficiency due to a friction in the rotary bearings. Also a lens-driving hollow cylindrical motor is disclosed in the U.S. Pat. No. 4,519,691, in which a movable coil 7 is fixed to a flange 10a provided at an outer end of a lens holder 10, and a bearing structure is composed of a ball bearing with a guide groove, provided at the flange.

In a hollow motor, the internal diameter of the hollow aperture at the center is limited by the dimensions of driving elements or other component parts, and such motor is still subjected to requirements for a smaller outer diameter and a shorter axial length. The use of the bearing known in the prior art not only results in an increase in the number of component parts, number of work steps for assembly and space required therefor. In addition, prior art bearings also poses limitations to the motor structure design. Consequently, it becomes necessary to develop a novel motor structure to accommodate the prior art bearing.

Also the aforementioned oil-containing sintered sliding bearing, in which lubrication is achieved by the oil flowing out from the bearing components to the sliding faces, may result in abnormal noises or abnormal abrasion due to mutual contact of metals at a lower temperature or at a low revolution where the amount of oil flow is lower.

SUMMARY OF THE INVENTION

The object of the present invention is to provide a bearing structure for a hollow coreless motor which can prevent the aforementioned drawbacks of the prior technology, allows the reduction of the number of component parts and the number of work steps for assembly and at the same time allows the reduction of the motor dimensions.

The above-mentioned object can be achieved, according to the present invention, by an embodiment shown in FIGS. 1 and 2.

According to the present invention, a coil 13 serving as a rotor is integrally formed with self-lubricating resin or oil-containing resin to constitute bearing roller portions 13a, 13b, which are used as component parts of roller bearings or sliding bearings.

The coil 13, serving as a rotor, is integrally formed with the bearing roller portions 13a, 13b with self-lubricating or oil containing resin of a low friction coefficient generally employed in plastic bearings. In this manner the strength and dimmensional precision required in rotation are improved, and additional bearing parts need not be separately attached. In addition, the bearing roller portions 13a, 13b, having lubricating ability therein, do not require coating of lubricating material. Particularly the heat generated by a current in the coil 13 during the motor rotation stimulates oil flow in the bearing rollers portions 13a, 13b positioned close to said coil 13, in case an oil-containing resin bearing is employed.

BRIEF DESCRIPTION OF THE DRAWINGS

FIG. 1 is a longitudinal cross-sectional view of an embodiment of a hollow coreless motor of the present invention;

FIG. 2 is a partial enlarged cross-sectional view of a bearing roller portion thereof;

FIG. 3 is a transversal cross-sectional view of a principal portion of said coil;

FIGS. 4 and 5 are partial cross-sectional views of other embodiments of the bearing roller portion of the present invention; and FIG. 6 is a longitudinal cross-sectional view of a conventional hollow coreless motor.

DETAILED DESCRIPTION OF THE PREFERRED EMBODIMENTS

Now the present invention will be clarified in detail by an embodiment thereof shown in FIGS. 1 to 3.

The main body of a coreless motor of hollow double cylinders is composed of an outer yoke 11a of a soft magnetic material constituting a stator and an inner yoke 11b. On the external periphery of said inner yoke 11b, there are fixed an annular magnet 12 and fixed bearing portions 19a, 19b on both sides of said magnet 12 in the axial direction and with a space thereto. In an air gap between said outer yoke 11a and said inner yoke 11b, there is provided a coil 13 serving as a rotor and facing said annular magnet 12, with a suitable air gap to said outer yoke 11a. Said coil 13 is integrally combined with a low-friction self-lubricating resinous material such as nylon or a resinous material capable of containing oil to form bearing roller portions 13a, 13b with semi-spherical seats in at least three equally distanced positions respectively corresponding to said fixed bearing portions 19a, 19b, and balls 20a, 20b are placed between the semi-spherical seats of said bearing rollers portions 13a, 13b and said fixed bearing portions 19a, 19b to constitute ball bearings.

A coil support member 14 supporting said coil 13 is provided with a commutator 14a and an output portion 14b for transmitting the motor rotation to the outside, and a brush support member 15 of a plastic material fixed at an end of said outer yoke 11a is provided with a brush support portion 16 for supporting brushes 17 which are in sliding contact with said commutator 14a and are connected with lead wires 18 for power supply.

Also sliding bearings may also be formed omitting the balls 20a, 20b, whereby the bearing roller portions 13a, 13b are in direct contact with the fixed bearing portions 19a, 19b.

FIG. 4 shows another embodiment of the present invention, wherein bearing roller portions 13a, 13b integrally formed with the coil 13 have a V-shaped cross section for holding ball bearings.

FIG. 5 shows still another embodiment of the present invention, wherein the bearing rollers portions 13a, 13b integrally formed with the coil 13 have inclined surfaces to constitute sliding bearings, and the positioning of the rotor in the thrust direction can be determined by forming the inclination of the surface of the portion 13a opposite to that of the unrepresented portion 13b.

In the foregoing embodiments, the bearing portions 13a, 13b are formed on the internal periphery of the coil 13, but they may also be formed on the outer periphery to achieve similar effects, according to various known structures of the coreless motor.

As explained in the foregoing, the present invention provides the advantages of reducing the number of steps of assembly process, improving the strength of rotor and the dimensional precision and reducing the dimension of the motor, by integrally forming a rotor coil with bearing rollers portions with self-lubricating or oil-containing resin.

What is claimed is:

1. A motor comprising:
   a first yoke member having a hollow cylindrical shape;
   an annular magnet provided on the outside of said first yoke member;
   a coil positioned outside said annular magnet, and formed of a self-lubricating resin or oil-containing resin material in the shape of a cylinder of which at least an integrally formed end portion having a face surface thereon radially inwardly protrudes to constitute a bearing portion for contacting ball bearings on the end face surfaces of said protruding portion;
   a second yoke member positioned outside said coil; and
   a fixed bearing portion formed on said second yoke whereon said ball bearings are disposed between said end face surfaces of said integrally formed end and said fixed bearing portion; and
   electric power supply means being attached to said coil for supplying power to said coil.

* * * * *

UNITED STATES PATENT AND TRADEMARK OFFICE
CERTIFICATE OF CORRECTION

PATENT NO. : 4,720,650
DATED : January 19, 1988
INVENTOR(S) : Ryoichi HANAMORI ET AL.

It is certified that error appears in the above-identified patent and that said Letters Patent is hereby corrected as shown below:

COLUMN 1

Line 15, "portion" should read --portion of--.

COLUMN 2

Line 13, "oil containing" should read --oil-containing--.

Line 15, "dimmensional" should read --dimensional--.

Line 22, "rollers" should read --roller--.

Line 61, "rollers" should read --roller--.

COLUMN 3

Line 13, "rollers" should read --roller--.

Line 19, "bearing portions" should read --bearing roller portions--.

UNITED STATES PATENT AND TRADEMARK OFFICE
CERTIFICATE OF CORRECTION

PATENT NO. : 4,720,650

DATED : January 19, 1988

INVENTOR(S) : Ryoichi HANAMORI ET AL.

It is certified that error appears in the above-identified patent and that said Letters Patent is hereby corrected as shown below:

COLUMN 4

Line 2, "rollers" should read -- roller --.

Signed and Sealed this

Eighth Day of November, 1988

Attest:

DONALD J. QUIGG

Attesting Officer      Commissioner of Patents and Trademarks